United States Patent
Koishi

(10) Patent No.: US 12,041,245 B2
(45) Date of Patent: *Jul. 16, 2024

(54) COMMUNICATION CONTROL SYSTEM AND COMMUNICATION CONTROL METHOD

(71) Applicant: NEC Corporation, Tokyo (JP)

(72) Inventor: Takahiro Koishi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/801,128

(22) PCT Filed: Mar. 10, 2021

(86) PCT No.: PCT/JP2021/009535
§ 371 (c)(1),
(2) Date: Aug. 19, 2022

(87) PCT Pub. No.: WO2021/182512
PCT Pub. Date: Sep. 16, 2021

(65) Prior Publication Data
US 2023/0077914 A1 Mar. 16, 2023

(30) Foreign Application Priority Data
Mar. 11, 2020 (JP) .................... 2020-041850

(51) Int. Cl.
*H04N 19/192* (2014.01)
*H04N 19/152* (2014.01)
*H04N 19/172* (2014.01)

(52) U.S. Cl.
CPC ......... *H04N 19/172* (2014.11); *H04N 19/152* (2014.11)

(58) Field of Classification Search
CPC .... H04N 19/172; H04N 19/152; H04N 19/11; H04N 19/124; H04N 19/115
(Continued)

(56) References Cited

U.S. PATENT DOCUMENTS

| 5,719,632 A | 2/1998 | Hoang et al. |
| 6,204,932 B1 * | 3/2001 | Haneda .................... H04N 1/40 358/1.9 |

(Continued)

FOREIGN PATENT DOCUMENTS

| JP | H09-214962 A | 8/1997 |
| JP | 2000-347999 A | 12/2000 |

(Continued)

OTHER PUBLICATIONS

International Search Report for PCT Application No. PCT/JP2021/009535, mailed on Jun. 1, 2021.
(Continued)

*Primary Examiner* — Fitwi Y Hailegiorgis

(57) ABSTRACT

To transmit image frame data appropriately according to the utilization rate of a receiving buffer and prevent the overflow of the receiving buffer, a communication control system transmits image frame data from a first communication device-to a second communication device. The second communication device includes a receiving buffer that receives image frame data from the first communication device, and a return unit that returns an ACK frame to the first communication device at timing reflecting a utilization rate of the receiving buffer. The first communication device includes an estimation unit that receives the ACK frame from the return unit of the second communication device and estimates the utilization rate of the receiving buffer from receiving time of the ACK frame, and a modification unit that modifies an image compression algorithm of the image frame data based on the estimated utilization rate of the receiving buffer.

8 Claims, 9 Drawing Sheets

(58) Field of Classification Search
USPC .......................................................... 375/240
See application file for complete search history.

(56) References Cited

U.S. PATENT DOCUMENTS

| | | | |
|---|---|---|---|
| 2003/0043272 A1* | 3/2003 | Nagao | H04N 1/00244 |
| | | | 348/231.2 |
| 2013/0058396 A1 | 3/2013 | Shimizu et al. | |
| 2015/0244760 A1 | 8/2015 | Tun et al. | |
| 2016/0261373 A1 | 9/2016 | Nagasaka et al. | |
| 2017/0264519 A1 | 9/2017 | Kanou | |
| 2018/0288650 A1 | 10/2018 | Suzuki et al. | |
| 2018/0332342 A1 | 11/2018 | Wu et al. | |
| 2023/0077785 A1* | 3/2023 | Koishi | H04N 19/115 |
| | | | 375/240.07 |

FOREIGN PATENT DOCUMENTS

| | | |
|---|---|---|
| JP | 2002-534864 A | 10/2002 |
| JP | 2005-128941 A | 5/2005 |
| JP | 2008-301309 A | 12/2008 |
| JP | 2017-163316 A | 9/2017 |
| JP | 2019-114947 A | 7/2019 |
| WO | 2011/138900 A1 | 11/2011 |
| WO | 2015/052843 A1 | 4/2015 |
| WO | 2016/088582 A1 | 6/2016 |

OTHER PUBLICATIONS

International Search Report for PCT Application No. PCT/JP2021/009512, mailed on May 18, 2021.
US Notice of Allowance for U.S. Appl. No. 17/801,121, mailed on Mar. 20, 2024.

* cited by examiner

| BUFFER UTILIZATION (%) | TRANSMISSION DELAY (ms) |
|---|---|
| 95 | T1 |
| 90 | T2 |
| 85 | T3 |
| 80 | T4 |
| 70 | T5 |
| ⋮ | ⋮ |
| 0 | Tn |

Fig. 6

| ESTIMATED BUFFER UTILIZATION (%) | COMPRESSION RATIO |
|---|---|
| 95 | a |
| 90 | b |
| 85 | c |
| 80 | d |
| 70 | e |
| ⋮ | ⋮ |
| 0 | n |

Fig. 8

COMMUNICATION CONTROL SYSTEM AND COMMUNICATION CONTROL METHOD

This application is a National Stage Entry of PCT/JP2021/009535 filed on Mar. 10, 2021, which claims priority from Japanese Patent Application 2020-041850 filed on Mar. 11, 2020, the contents of all of which are incorporated herein by reference, in their entirety.

TECHNICAL FIELD

The present disclosure relates to a communication control system and a communication control method.

BACKGROUND ART

A communication control system transmits image frame data from a first communication device (transmitting end) to a second communication device (receiving end), and returns an ACK frame for this image frame data from the second communication device to the first communication device. The ACK frame is given a number corresponding to the received frame and returned to the transmitting end. The transmitting end thereby recognizes that data receiving has failed at the receiving end and, in some cases, transmits this image frame data again.

For example, Patent Literature 1 discloses a computer system in which one or more central processing units are configured to connect a disk control unit through a fiber channel, wherein the disk control unit delays the transmission of a response frame in response to a frame received from the central processing unit when the multiplicity of exchanges, which is a series of transmitting and receiving sequences of commands and data exchanged with the central processing unit, exceeds a predetermined threshold.

CITATION LIST

Patent Literature

PTL1: Japanese Unexamined Patent Application Publication No. 2000-347999

SUMMARY OF INVENTION

Technical Problem

However, the above-described computer system cannot support real-time processing due to the waiting time for complementing the missing data by receiving buffer overflow. Also, the computer system is unable to appropriately modify an image compression algorithm according to the utilization rate of a receiving buffer even though the image compression is effective way to prevent the receiving buffer overflow.

An object of the present disclosure is thus to provide a communication control system and a communication control method capable of appropriately modifying an image compression algorithm according to the utilization rate of a receiving buffer.

Solution to Problem

A communication control system according to a first aspect of the present disclosure is a communication control system that transmits image frame data from a first communication device to a second communication device, the second communication device including a receiving buffer configured to receive image frame data from the first communication device; a return unit configured to return an ACK frame to the first communication device at timing reflecting a utilization rate of the receiving buffer, and the first communication device including an estimation unit configured to receive the ACK frame from the return unit of the second communication device and estimate the utilization rate of the receiving buffer of the second communication device from receiving time of the ACK frame; a modification unit configured to modify an image compression algorithm of the image frame data on the basis of the estimated utilization rate of the receiving buffer; and a transmitting unit configured to transmit the image frame data from the first communication device to the second communication device.

A communication control method according to a second aspect of the present disclosure is a communication control method that transmits image frame data from a first communication device to a second communication device, including, in the second communication device, receiving image frame data from the first communication device by a receiving buffer; and returning an ACK frame to the first communication device at timing reflecting a utilization rate of the receiving buffer, and in the first communication device, receiving the ACK frame from the second communication device and estimating the utilization rate of the receiving buffer of the second communication device from receiving time of the ACK frame; modifying an image compression algorithm of the data on the basis of the estimated utilization rate of the receiving buffer; and transmitting the image frame data from the first communication device to the second communication device.

Advantageous Effects of Invention

According to the present disclosure, image frame data is transmitted appropriately according to the utilization rate of a receiving buffer, which allows preventing the overflow of the receiving buffer.

BRIEF DESCRIPTION OF DRAWINGS

FIG. 6 is a table showing the transmission delay responsive to the utilization rate of a receiving buffer.

FIG. 8 is a table showing the compression ratio responsive to the estimated utilization rate of a receiving buffer.

EXAMPLE EMBODIMENT

First Example Embodiment

An example embodiment of the present invention will be described hereinafter with reference to the drawings.

Figure 1:
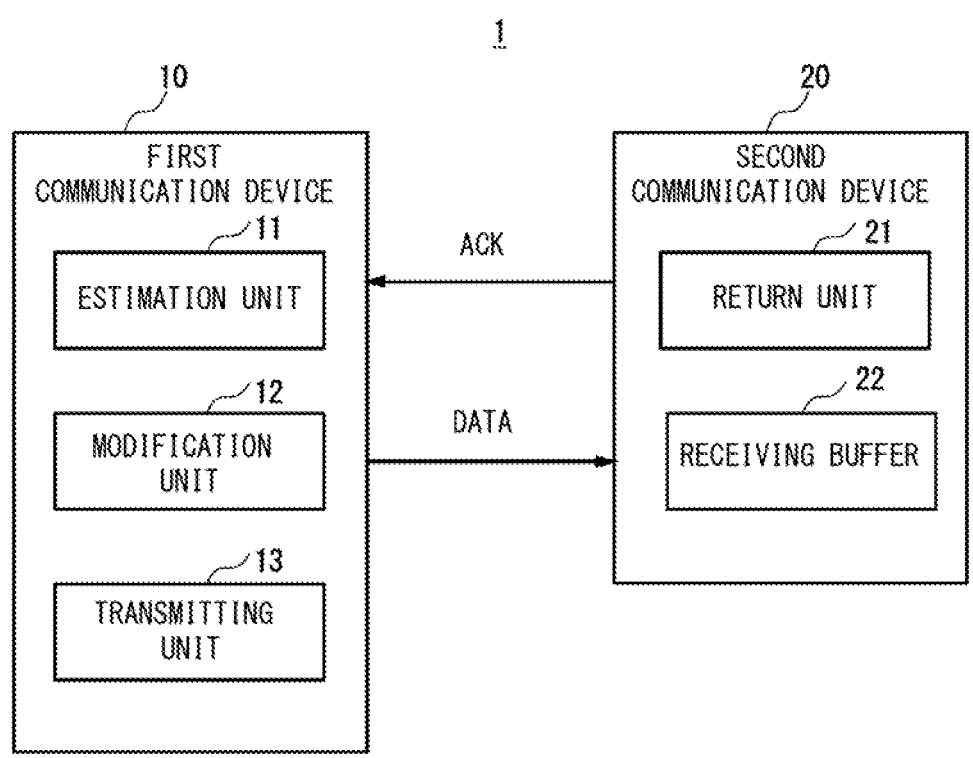
FIG. 1 is a block diagram showing the configuration of a communication control system according to a first example embodiment.

FIG. 1 is a block diagram showing the configuration of a communication control system according to a first example embodiment.

A communication control system 1 includes a first communication device 10 and a second communication device 20 connected to the first communication device 10 through a network. The first communication device 10 transmits image frame data to the second communication device 20, and the second communication device 20 returns an ACK frame in response to the received frame to the first communication device 10.

The second communication device 20 includes a receiving buffer 22 that receives image frame data from the first communication device 10, and a return unit 21 that returns an ACK frame to the first communication device 10 at the timing of reflecting the utilization rate of the receiving buffer 22.

The first communication device 10 includes an estimation unit 11, a modification unit 12, and a transmitting unit 13. The estimation unit 11 receives an ACK frame from the return unit 21 of the second communication device 20, and estimates the utilization rate of the receiving buffer 22 of the second communication device 20 on the basis of the receiving time of this ACK frame. The modification unit 12 modifies a compression algorithm of the data on the basis of the estimated utilization rate of the receiving buffer. The transmitting unit 13 transmits the image frame data from the first communication device 10 to the second communication device 20.

Figure 2:
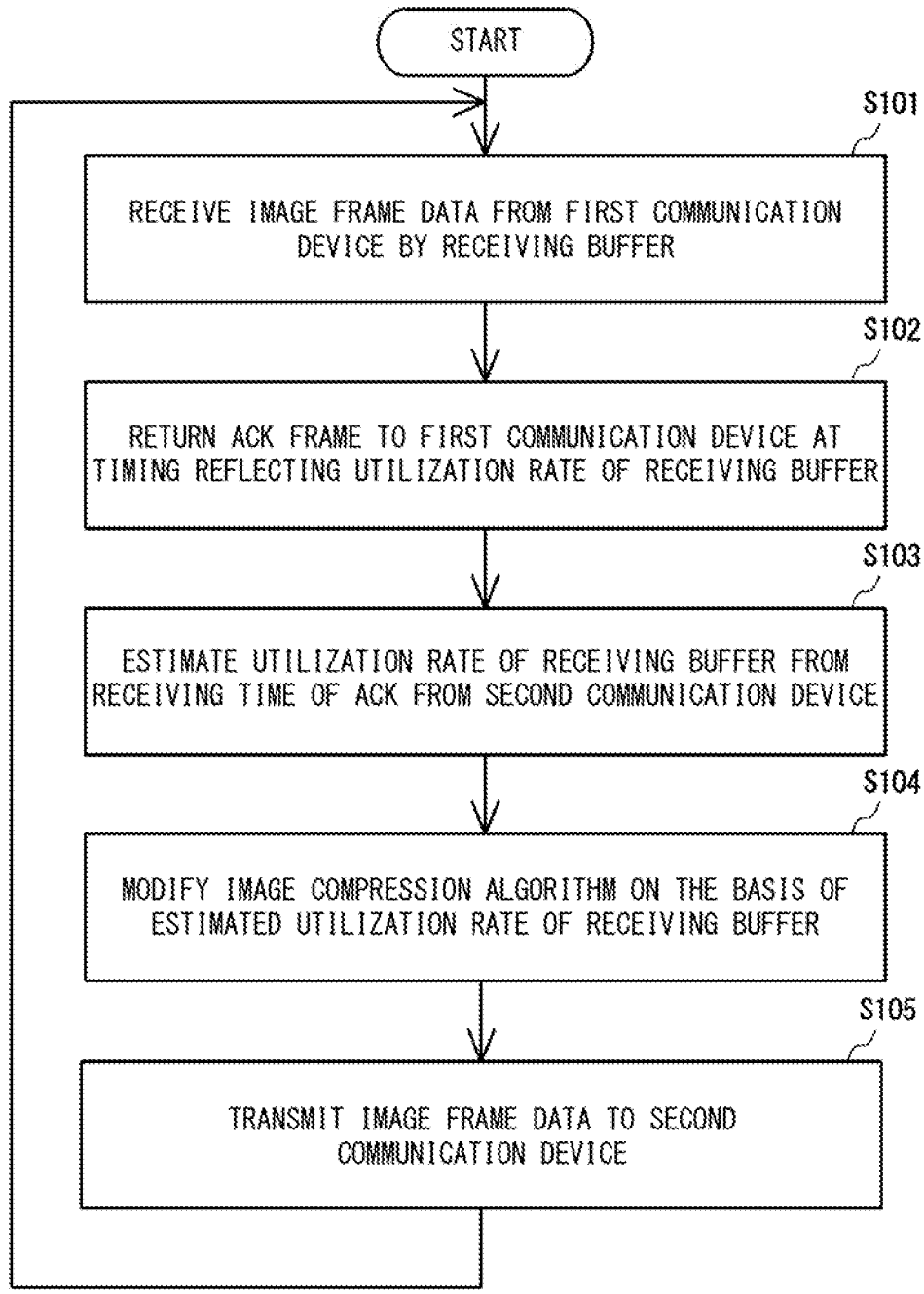
FIG. 2 is a flowchart showing a communication control method according to the first example embodiment.

FIG. 2 is a flowchart showing a communication control method according to the first example embodiment.

The communication control system 1 transmits image frame data from the first communication device 10 to the second communication device 20, and then returns an ACK frame for this image frame data from the second communication device 20 to the first communication device 10. First, the second communication device 20 receives the image frame data from the first communication device 10 by the receiving buffer 22 (Step S101). The second communication device 20 returns an ACK frame to the first communication device 10 at appropriate timing according to the utilization rate of the receiving buffer 22 (Step S102). For example, the second communication device 20 can return the ACK frame at timing that is increasingly delayed as the utilization rate of the receiving buffer increases.

The first communication device 10 estimates the utilization rate of the receiving buffer on the basis of the receiving time of the ACK frame from the second communication device 20 (Step S103). The first communication device 10 modifies the image compression algorithm on the basis of the estimated utilization rate of the receiving buffer (Step S104). The first communication device 10 then transmits the image frame data to the second communication device 20 (Step S105). After that, the process returns to Step S101.

The communication control system according to this example embodiment is thereby capable of appropriately transmitting image frame data according to the utilization rate of the receiving buffer, which allows preventing the overflow of the receiving buffer.

Second Example Embodiment

The present disclosure relates to a diagnostic imaging system that remotely transmits an uncompressed (RAW) image taken by a camera and performs diagnoses. Existing diagnostic imaging systems mainly have two issues. A first issue is that, when an image receiving buffer overflows in a diagnostic imaging system, camera image data that overflows from the buffer is discarded in order to continue the diagnostic imaging operation.

The reason is as follows. In general, a diagnostic imaging system is designed to perform a diagnostic process, such as appearance check of products conveyed on a conveyor belt, continuously and at high speed. Therefore, even if a receiving buffer is filled with data, image data to check subsequent products are sent one after another. It is therefore necessary to continue the operation by discarding the overflowing data.

A second issue is that, in most cases, the above diagnostic imaging system uses RAW images without any informational lack.

The reason is as follows. Generally, when an unprocessed RAW image is used as evidence of diagnostic imaging and a diagnostic imaging result contains an error, it is necessary to check the error by using the unprocessed image in order to determine an error of an image compression algorithm.

Whereas the diagnostic imaging system typically performs diagnosis by using RAW images, it reduces the amount of image data appropriately so as not to affect diagnosis according to the condition of a receiving buffer. This allows reliable transmission of image data to the diagnostic imaging system without discarding the data even when the remaining space of the receiving buffer is small, and thereby improves the degradation of the defect detection rate due to the lack of an image.

The diagnostic imaging system according to this example embodiment monitors the congestion of a transmission line in real time by using ACK packets exchanged between a camera and a host, for example, and reduces color information by color clustering and modifies the amount of color subtraction adaptively depending on the state of congestion. This prevents the lack of an inspection image due to the overflow of the receiving buffer on the host side and thereby solves the degradation of the defect detection rate of the diagnostic imaging system. Note that the diagnostic imaging system according to this example embodiment is an example of the communication control system 1 according to the first example embodiment.

Figure 3:
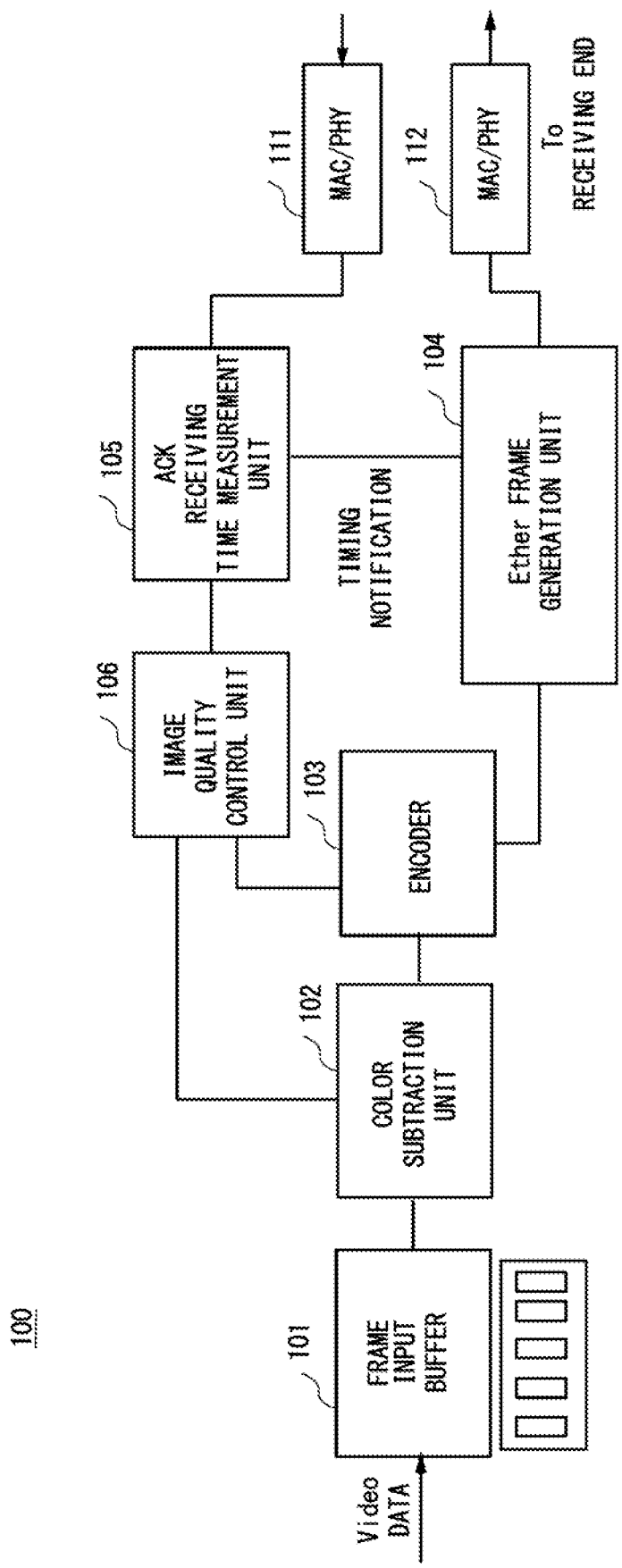
FIG. 3 is a block diagram showing the configuration of a transmitting end communication device according to a second example embodiment.

FIG. 3 is a block diagram showing the configuration of a transmitting end communication device according to the second example embodiment.

The transmitting end communication device 100 can be implemented by an information processing device or the like that includes a processor such as a CPU (Central Processing Unit) and a memory, for example. The transmitting end communication device 100 is an example of the first communication device 10 according to the first example embodiment. Referring to FIG. 3, the transmitting end communication device 100 includes a frame input buffer 101, a color subtraction unit 102, an encoder 103, an Ether frame generation unit 104, an ACK receiving time measurement unit 105, an image quality control unit 106, a MAC/PHY 111, and a MAC/PHY 112. Note that the MAC/PHY 111 and the MAC/PHY 112 of the transmitting end communication device 100 are connected to a MAC/PHY 211 and a MAC/PHY 212 of the receiving end communication device through a link such as an Ethernet (registered trademark) link.

The frame input buffer 101 is a buffer that temporarily stores image frames from a video camera or the like. The color subtraction unit 102 receives a control signal from the image quality control unit 106 and performs appropriate color subtraction on a frame from the frame input buffer 101. The encoder 103 receives a control signal from the image quality control unit 106 and encodes the color-subtracted data with an appropriate compression ratio. The Ether frame generation unit 104 generates an Ether frame from the color-subtracted and encoded frame, and transmits it to the receiving end communication device 200 via the MAC/PHY 112. Further, when transmitting the Ether frame, the Ether frame generation unit 104 sends a transmitted time of the Ether frame to the ACK receiving time measurement unit 105.

In general, the diagnostic imaging system that includes the transmitting end communication device 100 and the receiving end communication device 200 uses and stores RAW images as evidence of diagnostic imaging in order to detect fine detects of an object to be inspected. Thus, the color subtraction unit 102 and the encoder 103 in the transmitting end communication device 100 shown in FIG. 3 do not perform compression and send a RAW image to the Ether frame generation unit 104, so that it is transmitted to a host (the receiving end communication device 200)

Figure 4:
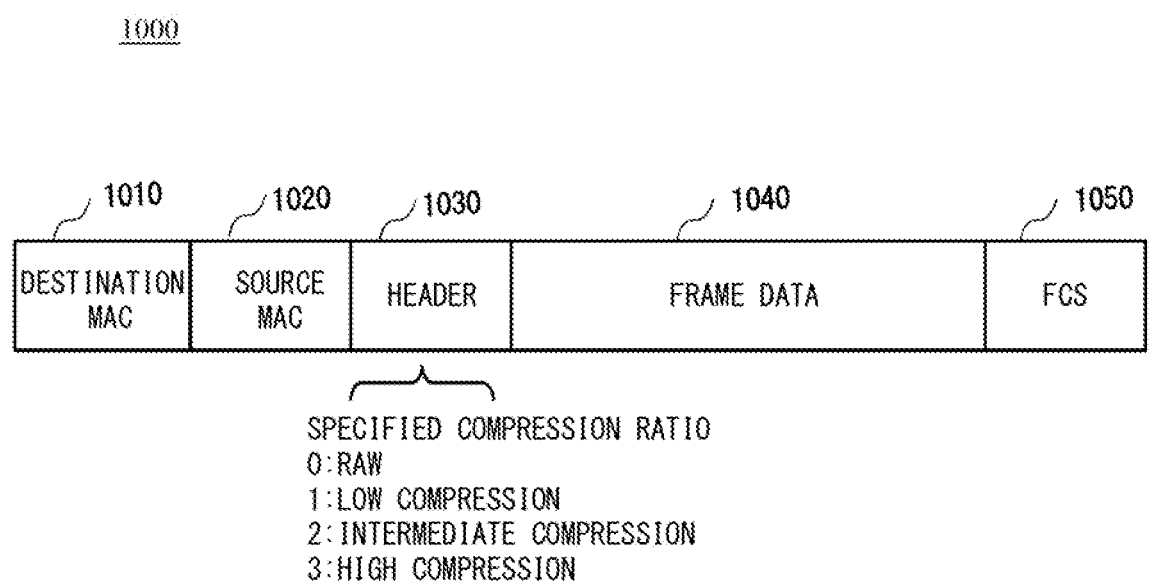
FIG. 4 is a view showing an example of a transmission packet frame format.

FIG. 4 shows a transmission packet frame format. A transmission packet frame 1000 contains a destination MAC 1010, a source MAC 1020, a header 1030, frame data 1040, and FCS (Frame Check Sequence) 1050. In this case, a code (e.g., 0) indicating a compression ratio is embedded in the header 1030 of the transmission packet frame 1000 by the Ether frame generation unit 104. The FCS is an error detecting code added to data upon transmission in order to check whether an error occurs in data in the course of communication. Although RAW (which means uncompression), low compression, intermediate compression and high compression are shown as the compression ratio in FIG. 4, the compression ratio is not limited thereto. The compression ratio may be set in more detail.

Figure 5:
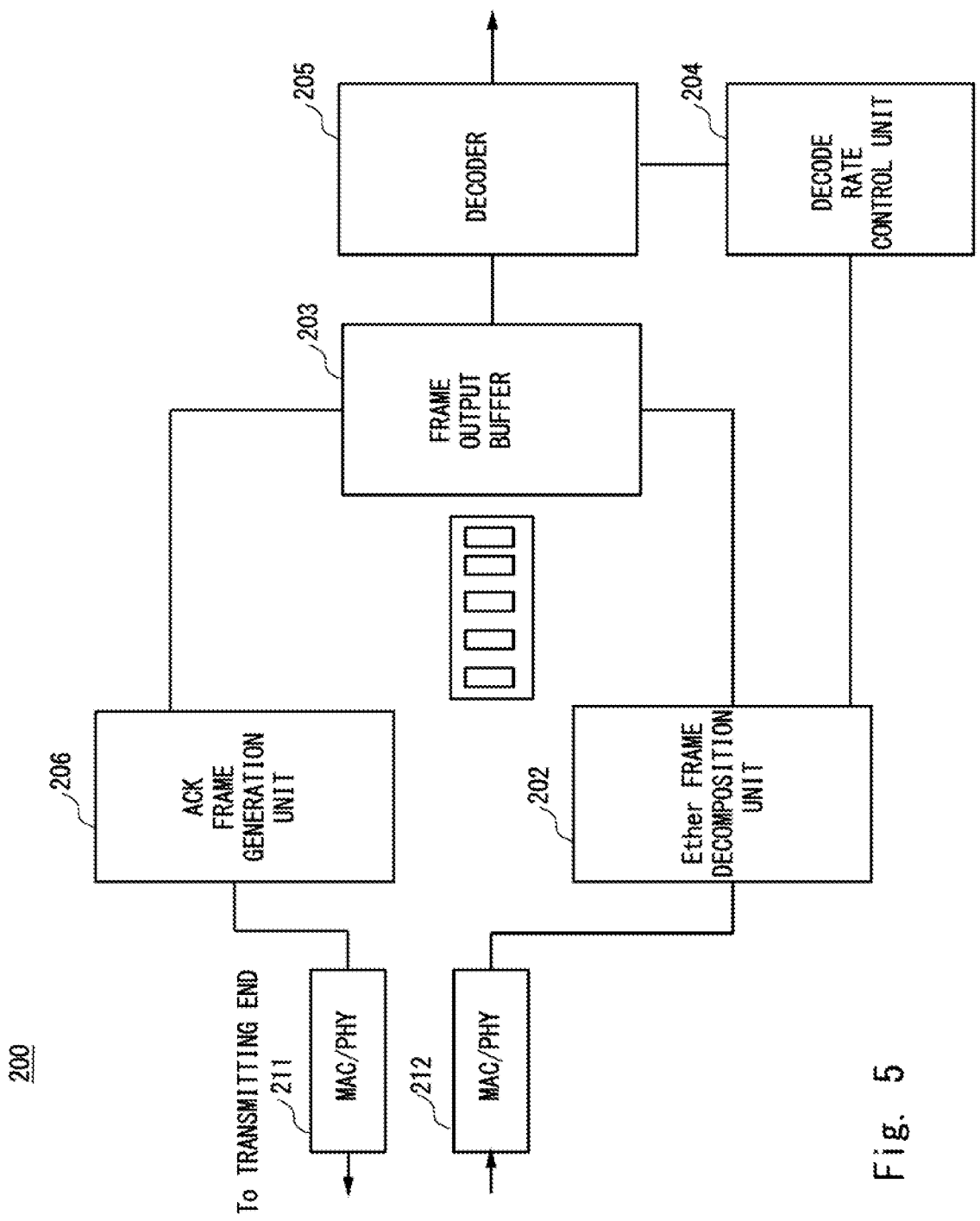
FIG. 5 is a block diagram showing the configuration of a receiving end communication device according to the second example embodiment.

FIG. 5 is a block diagram showing the configuration of a receiving end communication device according to the second example embodiment.

The receiving end communication device 200 can be implemented by an information processing device or the like that includes a processor such as a CPU (Central Processing Unit) and a memory, for example. This information processing device may perform diagnostic imaging or the like. The receiving end communication device 200 is an example of the second communication device 20 according to the first example embodiment. The receiving end communication device 200 includes an Ether frame decomposition unit 202, a frame output buffer 203, a decode rate control unit 204, a decoder 205, and an ACK frame generation unit 206.

In the receiving end communication device 200 shown in FIG. 5, the Ether frame decomposition unit 202 interprets the contents of a received packet. Further, the decode rate control unit 204 determines a decode rate of the packet. Since the compression ratio of the received packet is now 0, the decode rate control unit 204 configures the decoder 205 to do uncompression, and thereby the decoder 205 processes received data from the frame output buffer 203 (which is referred to also as a receiving buffer) and reconstructs an inspection image without any coding. The ACK frame generation unit 206 generates an ACK frame for the received frame and returns it to the transmitting end communication device 100 at timing responsive to the utilization rate of the frame output buffer 203.

As an example of the timing responsive to the utilization rate of the frame output buffer 203, the timing of returning an ACK frame may be delayed when the utilization rate is a threshold is higher. To be more specific, the return timing may be delayed in a stepwise fashion (in FIG. 6, transmission delay (ms) can be set to: $T_1 > T_2 > T_3 > T_4 > T_5 > \ldots > T_n$) according to the utilization rate of the receiving buffer (e.g., 95%, 90, 85, 80, ..., 0%). Note that the transmission delay referred to herein is the delay time after the ACK frame generation unit 206 generates an ACK frame until it transmits the ACK frame in consideration of the utilization rate of the receiving buffer.

Figure 7:
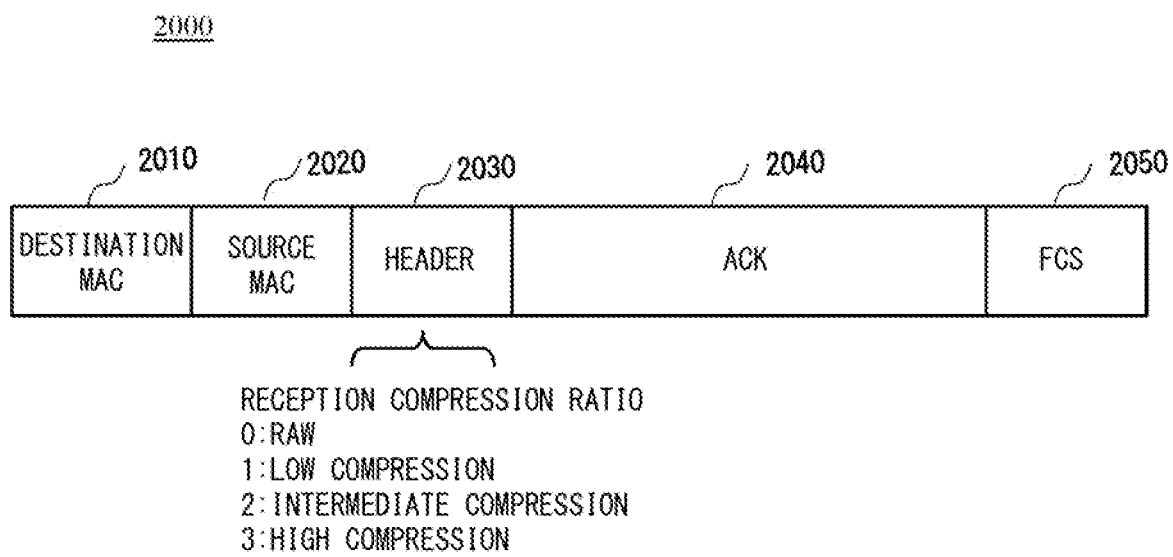
FIG. 7 is a view showing an example of a received packet frame format.

FIG. 7 shows an example of an ACK frame 2000. The ACK frame 2000 contains a destination MAC 2010, a source MAC 2020, a header 2030, ACK 2040, and FCS 2050. A code (0) indicating the received compression ratio is embedded in the header 2030 of the ACK frame 2000 by the ACK frame generation unit 206. Note that the header shows a reception compression ratio indicating RAW (which means uncompression), low compression, intermediate compression, high compression or the like.

In the transmitting end communication device 100, the ACK receiving time measurement unit 105 compares a transmitted time indicated by a timing notification from the Ether frame generation unit 104 with a received time (arrival time) of an ACK packet and calculates ACK receiving time, which is a difference between those times. On the basis of the calculated receiving time, the ACK receiving time measurement unit 105 estimates the available space of the frame output buffer 203 (which is also referred to as a receiving buffer) of the receiving end communication device 200. Specifically, the ACK receiving time measurement unit 105 can estimate that the free space of the receiving buffer is large when the ACK receiving time is short and, in contrast, estimate that the free space of the receiving buffer is small when the ACK receiving time is long. The image quality control unit 106 generates control signals for the color subtraction unit 102 and the encoder 103 according to the estimated free space of the receiving buffer. To be specific, the image quality control unit 106 determines color subtraction (clustering) of the color subtraction unit 102 on the basis of the free space of the receiving buffer estimated from the receiving time. Since the transmission channel environment assumed herein has no congestion, the image quality control unit 106 selects no color clustering for the color subtraction unit 102.

Next, assume the case where congestion occurs in the transmission line. In the state where congestion occurs in the transmission line, there is no enough free space in the frame output buffer 203. Detecting this state, the ACK frame generation unit 206 transmits an ACK packet after waiting for a specified period of time. For example, as described earlier with reference to FIG. 6, the return timing may be delayed in a stepwise fashion according to the utilization rate of the receiving buffer (e.g., 95, 90, 85, 80, ..., 0). The ACK receiving time measurement unit 105 receives the ACK packet and measures ACK receiving time from a transmitted time of the frame and a received time of the ACK. From this receiving time, the ACK receiving time measurement unit 105 estimates how much space of the receiving buffer is filled, and sends the estimated amount of free space of the buffer to the image quality control unit 106. Generally, as the amount of color information is larger, the defect detection rate of image inspection on the basis of this information increases, and it is more effective as evidence. Therefore, it is preferred that the transmitting end communication device 100 transmits RAW data to the receiving end communication device 200. However, when a notification indicating congestion of the transmission line is received, the image quality control unit 106 appropriately controls the color subtraction unit 102 and the encoder 103 on the basis of the estimated utilization rate of the receiving buffer.

For example, the image quality control unit 106 configures the color subtraction unit 102 to perform color subtraction by color clustering in order to prevent the buffer overflow. The image quality control unit 106 sets a size that is receivable by the frame output buffer 203, such as color subtraction from full color to three colors, for example. The color subtraction unit 102 performs color subtraction according to an instruction from the image quality control unit 106.

Further, the image quality control unit 106 determines an appropriate compression ratio for the encoder 103. FIG. 8 is a table showing the compression ratio responsive to the estimated utilization rate of a receiving buffer. The compression ratio is set to be higher (a>b>c>d>e . . . ) as the buffer utilization rate increases. Further, when the utilization rate of the receiving buffer is less than a threshold (e.g., 50%), the image quality control unit 106 may disable compression of the image frame. When the estimated utilization rate of the receiving buffer is less than a threshold, such as in the initial stage when the transmitting end communication device 100 transmits an image frame, the image quality control unit 106 may determine data as uncompressed image data (RAW data). Note that, as shown in FIGS. 4 and 7, an example of the compression ratio set by the image quality control unit 106 may include at least four levels of compression ratios: uncompression (RAW), low compression, intermediate compression, and high compression; however, the compression ratio is not limited thereto.

The encoder 103 compresses the image data to an appropriate size by using irreversible or reversible compression. In this case, a code (e.g., 1, 2 or 3) indicating the set compression ratio is embedded in the header 1030 of the transmission packet frame 1000 by the Ether frame generation unit 104.

As described above, the diagnostic imaging system according to this example embodiment is capable of preventing the overflow of a receiving buffer and transmitting images taken even when congestion occurs in a transmission line due to interruption of processing on the host (receiving end communication device) side or the like. This prevents the degradation of the defect detection rate due to the lack of an image. Note that, although the defect rate detected from a color subtracted image or a compressed image is expected to be the same or lower than the defect detection rate detected from a RAW image, 100% inspection is at least achieved. Further, compared with existing diagnostic imaging systems, this diagnostic imaging system is more advantageous in that timing when a defective product is mixed is assumable from the image size.

A first advantageous effect is improvement of the defect detection rate in the diagnostic imaging system. By transmitting image data necessary for diagnosis to the diagnosing side without causing the overflow of an image receiving buffer in a diagnostic device, diagnosis of a sequence of images is performed with no omission.

A second advantageous effect is improvement of the reliability of defect detection in the diagnostic imaging system. In the case where an existing system lacks one of 100 images, for example, it is unknown for which inspection object the one image is missing and which products the remaining 99 non-defective items are associated with, which causes a decrease in the reliability of diagnosis for the other non-defective items as well. By achieving 100% inspection without the overflow of a receiving buffer, an object to be inspected and an image completely correspond to each other, which enhances the reliability of diagnosis between defective and non-defective.

Figure 9:
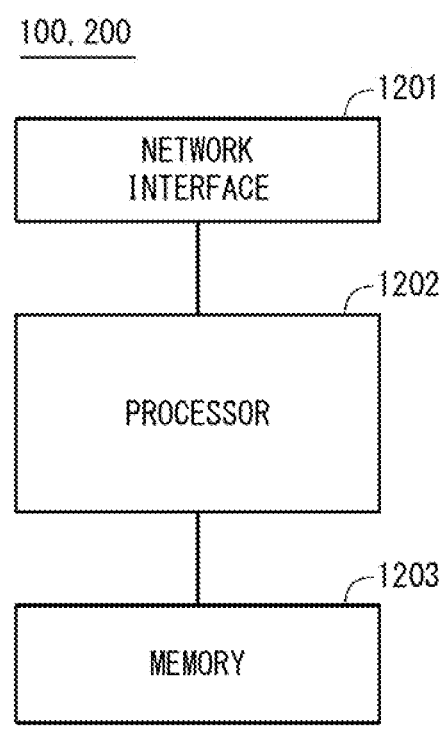
FIG. 9 is a block diagram showing a hardware configuration example of the transmitting end communication device and the receiving end communication device.

FIG. 9 is a block diagram showing a configuration example of the transmitting end communication device 100 and the receiving end communication device 200 (which are referred to hereinafter as the transmitting end communication device 100 etc.). Referring to FIG. 9, the transmitting end communication device 100 etc. includes a network interface 1201, a processor 1202, and a memory 1203. The network interface 1201 is used to communicate with another network node that constitutes the communication system. The network interface 1201 may be used to perform radio communication. For example, the network interface 1201 may be used to perform wireless LAN communication defined by IEEE 802.11 series or mobile communication defined by 3GPP (3rd Generation Partnership Project). Alternatively, the network interface 1201 may include a network interface card (NIC) that complies with the IEEE 802.3 series, for example.

The processor 1202 reads and runs software (computer program) from the memory 1203 and thereby executes processing of the transmitting end communication device 100 etc. that is described with reference to the flowchart or the sequence chart in the example embodiments described above. The processor 1202 may be a microprocessor, an MPU (Micro Processing Unit) or a CPU (Central Processing Unit), for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 9, the memory 1203 is used to store a group of software modules. The processor 1202 performs the processing of the transmitting end communication device 100 etc. described in the above example embodiments by reading the group of software modules from the memory 1203 and executing them.

As described with reference to FIG. 9, each of processors included in the transmitting end communication device 100 etc. runs one or a plurality of programs including a group of instructions for causing a computer to perform the algorithms described using the drawings.

In the above example, the program can be stored and provided to a computer using any type of non-transitory computer readable medium. Non-transitory computer readable media include any type of tangible storage medium. Examples of the non-transitory computer readable media include magnetic storage media (e.g., flexible disks, magnetic tapes, hard disk drives, etc.), optical magnetic storage media (e.g. magneto-optical disks), CD-ROM (Read Only Memory), CD-R, CD-R/W, DVD (Digital Versatile Disc), BD (Blu-ray (registered trademark) Disc), semiconductor memories (e.g., mask ROM, PROM (Programmable ROM), EPROM (Erasable PROM), flash ROM, and RAM (Random Access Memory)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line.

Note that the present invention is not limited to the above-described example embodiments and can be modified as appropriate without departing from the spirit and scope of the present disclosure.

The whole or part of the example embodiments disclosed above can be described as, but not limited to, the following supplementary notes.

(Supplementary note 1) A communication control system that transmits image frame data from a first communication device to a second communication device,
the second communication device comprising:
a receiving buffer configured to receive image frame data from the first communication device;
a return unit configured to return an ACK frame to the first communication device at a timing reflecting a utilization rate of the receiving buffer, and
the first communication device comprising:
an estimation unit configured to receive the ACK frame from the return unit of the second communication device and estimate the utilization rate of the receiving buffer of the second communication device from a receiving time of the ACK frame;
a modification unit configured to modify an image compression algorithm of the image frame data on the basis of the estimated utilization rate of the receiving buffer; and
a transmitting unit configured to transmit the image frame data from the first communication device to the second communication device.

(Supplementary note 2) The communication control system according to note 1, wherein the image compression algorithm includes color clustering.

(Supplementary note 3) The communication control system according to note 1 or 2, wherein the image compression algorithm includes a compression ratio.

(Supplementary note 4) The communication control system according to any one of notes 1 to 3, wherein the return unit transmits the ACK frame at a timing that is increasingly delayed in a stepwise fashion as the utilization rate of the receiving buffer increases.

(Supplementary note 5) The communication control system according to any one of notes 1 to 4, wherein the modification unit compresses an image in such a way that a compression ratio increases in a stepwise fashion as the estimated utilization rate of the receiving buffer increases.

(Supplementary note 6) The communication control system according to any one of notes 1 to 5, wherein the modification unit sets the image frame data to uncompressed image data when the estimated utilization rate of the receiving buffer is less than a threshold.

(Supplementary note 7) The communication control system according to any one of notes 1 to 6, wherein the estimation unit calculates an ACK receiving time by comparing a transmitted time of the image frame data from the transmitting unit with a received time of the ACK frame for the image frame data, and estimates the utilization rate of the receiving buffer from the calculated ACK receiving time.

(Supplementary note 8) A communication control method that transmits image frame data from a first communication device to a second communication device, comprising:
in the second communication device,
receiving, by a receiving buffer, image frame data from the first communication device; and
returning an ACK frame to the first communication device at a timing reflecting a utilization rate of the receiving buffer, and
in the first communication device,
receiving the ACK frame from the second communication device and estimating the utilization rate of the receiving buffer of the second communication device from a receiving time of the ACK frame;
modifying an image compression algorithm of the data on the basis of the estimated utilization rate of the receiving buffer; and
transmitting the image frame data from the first communication device to the second communication device.

Although the present invention is described above with reference to the example embodiments, the present invention is not limited to the above-described example embodiments. Various changes and modifications as would be obvious to one skilled in the art may be made to the structure and the details of the present invention without departing from the scope of the invention.

This application is based upon and claims the benefit of priority from Japanese patent application No. 2020-041850 filed on Mar. 11, 2020, the disclosure of which is incorporated herein in its entirety by reference.

REFERENCE SIGNS LIST

1 COMMUNICATION CONTROL SYSTEM
10 FIRST COMMUNICATION DEVICE
11 ESTIMATION UNIT
12 MODIFICATION UNIT
13 TRANSMITTING UNIT
20 SECOND COMMUNICATION DEVICE
21 RETURN UNIT
22 RECEIVING BUFFER
100 TRANSMITTING END COMMUNICATION DEVICE
101 FRAME INPUT BUFFER
102 COLOR SUBTRACTION UNIT
103 ENCODER
104 ETHER FRAME GENERATION UNIT
105 ACK RECEIVING TIME MEASUREMENT UNIT
106 IMAGE QUALITY CONTROL UNIT
111 MAC/PHY
112 MAC/PHY
200 RECEIVING END COMMUNICATION DEVICE
202 ETHER FRAME DECOMPOSITION UNIT
203 FRAME OUTPUT BUFFER
204 DECODE RATE CONTROL UNIT
205 DECODER
206 ACK FRAME GENERATION UNIT
211 MAC/PHY
212 MAC/PHY
1000 TRANSMISSION PACKET FRAME
2000 RECEIVED PACKET FRAME

What is claimed is:
1. A communication control system that transmits image frame data from comprising a first communication device and a second communication device,
the second communication device comprising:
a receiving buffer configured to receive image frame data from the first communication device;
a return unit configured to return an ACK frame to the first communication device at a timing reflecting a utilization rate of the receiving buffer, and the first communication device comprising:
- an estimation unit configured to receive the ACK frame from the return unit of the second communication device and estimate the utilization rate of the receiving buffer of the second communication device from a receiving time of the ACK frame;
- a modification unit configured to modify an image compression algorithm of the image frame data on the basis of the estimated utilization rate of the receiving buffer; and
- a transmitting unit configured to transmit the image frame data from the first communication device to the second communication device.

2. The communication control system according to claim 1, wherein the image compression algorithm includes color clustering.

3. The communication control system according to claim 1, wherein the image compression algorithm includes a compression ratio.

4. The communication control system according to claim 1, wherein the return unit transmits the ACK frame at a timing that is increasingly delayed in a stepwise fashion as the utilization rate of the receiving buffer increases.

5. The communication control system according to claim 1, wherein the modification unit compresses an image in such a way that a compression ratio increases in a stepwise fashion as the estimated utilization rate of the receiving buffer increases.

6. The communication control system according to claim 1, wherein the modification unit sets the image frame data to uncompressed image data when the estimated utilization rate of the receiving buffer is less than a threshold.

7. The communication control system according to claim 1, wherein the estimation unit calculates an ACK receiving time by comparing a transmitted time of the image frame data from the transmitting unit with a received time of the ACK frame for the image frame data, and estimates the utilization rate of the receiving buffer from the calculated ACK receiving time.

8. A communication control method performed by a first communication device and a second communication device, comprising:
- in the second communication device,
- receiving, by a receiving buffer, image frame data from the first communication device; and
- returning an ACK frame to the first communication device at a timing reflecting a utilization rate of the receiving buffer, and
- in the first communication device,
- receiving the ACK frame from the second communication device and estimating the utilization rate of the receiving buffer of the second communication device from a receiving time of the ACK frame;
- modifying an image compression algorithm of the data on the basis of the estimated utilization rate of the receiving buffer; and
- transmitting the image frame data from the first communication device to the second communication device.

* * * * *